United States Patent [19]
Dillmann

[11] 3,753,474
[45] Aug. 21, 1973

[54] VEHICLE OVERTURN PREVENTER

[76] Inventor: Eugene Roland Dillmann, 398 Washington St., Bay St. Louis, Miss. 39520

[22] Filed: June 4, 1971

[21] Appl. No.: 150,020

[52] U.S. Cl............................. 180/104, 200/61.52
[51] Int. Cl............................................ B60k 27/08
[58] Field of Search................... 180/82.3, 103, 104; 200/61.52

[56] References Cited
UNITED STATES PATENTS

| | | | |
|---|---|---|---|
| 1,411,298 | 4/1922 | Osborn | 180/104 X |
| 1,613,112 | 1/1927 | Lauck | 180/82.31 X |
| 3,038,151 | 6/1962 | O'Connor et al. | 200/61.52 X |
| 3,123,801 | 3/1964 | Bosler | 200/61.52 X |

FOREIGN PATENTS OR APPLICATIONS 255,249  7/1926  Great Britain...................... 180/104

*Primary Examiner*—Kenneth H. Betts
*Attorney*—Alvin Edward Moore

[57] ABSTRACT

Mechanism for preventing overturn of a tractor or other vehicle when it rears to a dangerous angle, comprising: a track that is inclined downward in a forward direction when the vehicle is in level position, and forwardly inclined upward when the front end of the vehicle has dangerously tipped upward; an upright chute connected to the rear end of the track; a spherical weight that normally remains at a forward part of the track, but when the vehicle is at a dangerous inclination moves down the track incline and falls down the chute; a device for controlling the power of the vehicle's motor comprising a lever pivotal in the chute (shown as an electric switch control lever, but optionally instead may be a throttle valve control lever), this device being actuated into motor-stopping position by the falling ball; and braking means for retarding and preventing movement of the ball into the chute due to vibrations of the vehicle and changes of its level until it reaches a dangerous angle, threatening overturn. This braking means comprises two elements: an upright baffle plate, making difficult the ball's climb out of a forward corner of the track; and a hinged, lead-weighted lever that must be pivoted out of the way before the ball enters the chute. Instead of the levered switch a push button may be utilized.

10 Claims, 3 Drawing Figures

PATENTED AUG 21 1973   3,753,474
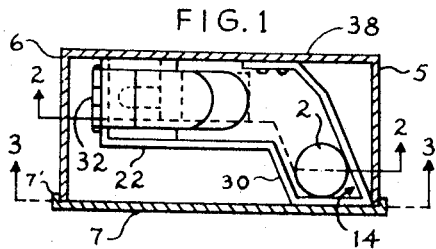
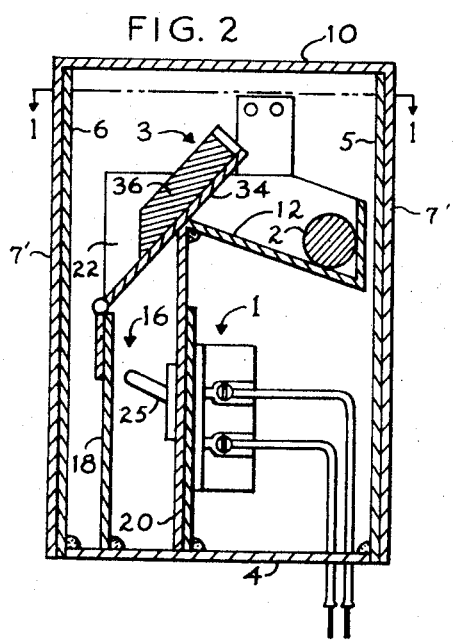
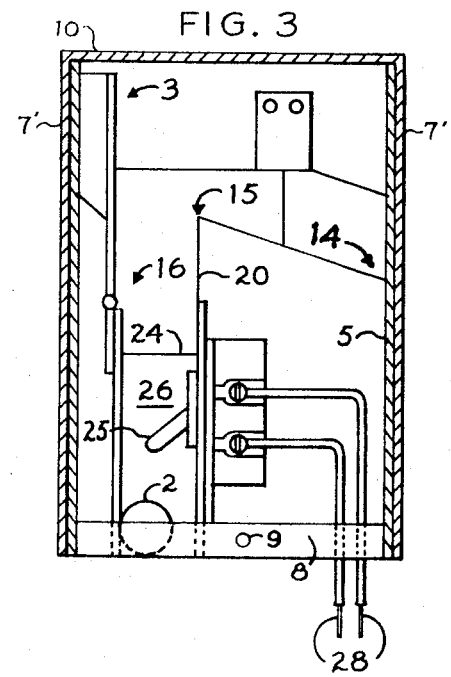
EUGENE R. DILLMANN,
INVENTOR.
BY
Alvin E. Moore
ATTORNEY

VEHICLE OVERTURN PREVENTER

Tractors and some other vehicles are dangerously susceptible, during steep angles of inclination, to overturn backward onto drivers; and especially in tractors this leads to frequent loss of human life. Such an overturn-tending angle may be caused, for example, by: attachment of a chain, cable or the like too far above the center line of the rear axle, combined with other circumstances; lifting an overload at the rear of the tractor; or too steep an inclination of the ground.

In view of these facts, an object of this invention is to provide means for efficiently and safely stopping an engine or other motor when the vehicle it is propelling rears up into a dangerous angle. Some other objects are to invent: (1) a motor-stopping device, automatically operated when a vehicle is in a dangerous inclination, comprising a motor control, a movable weight for operating the control, an inclined track, and means for braking undesired movement of the weight because of vibrations; (2) such a device in which the movable weight is a ball, and the braking means comprises a weighted lever, pivoted out of the way by the ball when force of gravity on it is sufficiently increased due to dangerous inclination of the vehicle. Other objects will be apparent from the following specification and the attached drawings.

In these drawings:

FIG. 1 is a top view of the motor-stopping device, in section from the plane 1—1 of FIG. 2, showing the motor-stopping ball in its normal, inoperative position;

FIG. 2 is an elevational view of the invented structure, mostly in section from the planes indicated at 2—2 in FIG. 1, but illustrating the cover 10 and the flanges 7' that are integral with the cover and side wall 7 in section along the plane 3—3 of FIG. 1; and FIG. 3 is an elevational view of the device, in section from the plane 3—3 of FIG. 1, but showing the ball as having moved in emergency and the motor-control switch as having been actuated by the ball to shut off current.

The invention comprises: a control box or housing; an inner support and weight channel; an electric switch 1 (or equivalent motor-control device, for example a throttle-valve lever); a rounded weight or ball 2, for moving the switch to shut off current from the motor when vehicle overturn is threatened; and a weighted lever 3, normally pivoted into its position of FIGS. 1 and 2, preventing motor-stopping movement of the ball.

The outer housing is designed to be fixed under the engine hood, with its bottom plate 4 in approximately level position when the vehicle is on level ground; its front wall 5 toward the forward end of the vehicle, and its wall 6 toward the rear. This box has a removable side wall 7, detachably secured to the ball-retaining ledge 8 by a screw in the threaded hole 9. This side wall optionally and as shown is integral with positioning flanges 7' and a cap or cover 10. The housing is illustrated as of sheet metal, welded at joints, but optionally it may be of molded plastic.

The inner structure for supporting the motor-stopping controls and providing the ball channel comprises: an inclined track 12, normally inclined upward toward the rear of the vehicle from its lowest and foremost ball-retaining position at the corner 14 to its rear edge 15 (FIG. 3); an upright ball chute 16, comprising a rear plate 18, a forward plate 20 that is integrally or weldedly joined to the rear edge 15 of the track, and a plate 22 that constitutes a downward extension of one of ball-guiding side flanges of the track 12. This plate 22 terminates at the lower edge 24, which is sufficiently low to hold the spherical weight above the motor control lever 25 (or push button) until the ball strikes the motor control element; and then it permits the ball to move out of the chute, via the gap 26, and to the side of the lever 25.

The switch 1 is electrically connected to the ignition system of the internal combustion engine (or alternatively to a vehicle-driving electric motor) by wires 28. This switch is of general conventional type, but preferably has a longer-than-average control lever 25 (or optionally an elongated push button), for facilitating its actuation by the weight.

The ball 2 may be of any heavy material. Preferably it is of steel, brass or bronze; but optionally it may be of lead — or lead plated over for protection against denting by a harder metal or alloy, for example by brass. Optionally (but not preferably), a sliding weight may be substituted for the ball — for example, a cube, with rounded corners.

This device is especially intended for use on tractors — vehicles that have a large amount of vibration. At times this vibration will jostle a steel ball until, without an emergency, it moves into the chute and stops the motor. Because of this fact an important feature of this invention comprises braking means for retarding upward movement of the ball on the track and preventing its entrance into the chute. This braking means consists of one or both of two braking elements. The first of these is the baffle plate 30, a part of one of the ball-retaining side flanges of the track. As illustrated in FIG. 1, these flanges are angled to cause the ball in upward climb from the corner 14 to be impeded by the baffle 30. Under certain circumstances — for example, sufficient ball weight and track inclination relative to the plane of the housing top 10 — the baffle plate alone can prevent this undesired vibratory movement of the ball into the chute. Also, with a straight track or trough, the weighted lever 3 may be made with sufficient weight and length of arm from the pivot of its hinge 32 to its center of mass to positively prevent such undesired movement of the ball, without the baffle plate 30. But this inventor currently prefers use of both of these braking elements, and has built very successful overturn-preventing devices that incorporated both of them. The pivoted lever, which is the main ball-retarding means, comprises the hinge-connected lever arm 34 and the thicker, heavier element 36 fixed to an upper portion of the arm 34. Although elements 34 and 36 may be integral (for example, of cast iron), preferably and as illustrated the arm 34 is of steel and the mass 36 is of lead.

OPERATION

During normal operation of the tractor (or other vehicle) the ball 2 tends to remain in the lower part of the inclined track. As it is jostled by ordinary vibrations of the tractor out of the lowest track corner 14 it is moved back toward the corner by the baffle plate 30 and the inclination of the track. But very strong vibrations, coupled at times by upward movement of the side wall 7 and downward movement of the wall 38 because of sidewise angling of the tractor, may cause the ball to move from in front of the baffle 30; and then, especially when on an upward but not dangerous slope of ground, these vibrations may force the ball near to the edge 15 of the chute. When under such low force the sphere is prevented from entering the chute by the inertia of the weighted lever 3.

But the gravity force on the ball is high when the front of the vehicle rears up to such extent that the track 12 is no longer upwardly inclined from the corner 14 to the edge 15, but instead is downwardly inclined from 14 to 15. This high gravity force causes the ball to pivot the lever 3 from its position in FIGS. 1 and 2 to that of FIG. 3; the ball then drops down the chute, and because of its weight strikes and moves the motor-control lever 25 of the switch (or push button or the like) into motor-stopping position.

When the engine stops the front end of the tractor safely settles back down. Thereafter: the combined side plate 7 and cover 10 are detached; the ball is removed from lodgment back of the ledge 8 and is replaced On the track 12; the weighted lever 3 is again set in its position of FIG. 2; and the cover and side plate are replaced and fastened by the screw in hole 9.

Within the scope of the following claims various changes in the specific disclosed structure may be made. For example: a push-button switch may be substituted for the illustrated levered switch; and instead of an electric switch the motor-control device may be a throttle valve having a control lever, actuated by the falling ball, of the type of the inventor's copending Patent application Ser. No. 96,948, filed on Dec. 10, 1970, now U.S. Pat. No. 3,712,405.

In the claims, unless otherwise qualified: the word "motor" means an internal combustion engine, an electric motor or a fluid motor; the term "movable, motor-control-actuating weight" signifies a ball or a sliding weight or other movable, weighted member that actuates a motor-stopping element; and the term "track" refers to a weight-guiding inclined element or a railed track.

I claim:

1. A device for preventing overturn of a motor-driven vehicle, comprising:
   an electric switch and switch-control housing;
   an upright chute, fixed to said housing, having an upper opening;
   a motor-controlling, switch-operating element, mounted in a lower portion of said chute, for electrically permitting or stopping power of the vehicle's motor;
   mechanism, automatically operated when the vehicle is in a dangerous, overturn-tending angle, for actuating said motor-controlling switch from its motor-operating to its motor-stopping position, comprising:
   a weighted-element track, fixed to said housing, normally inclined upward from a track end that is spaced from said chute, but inclined downward toward said chute opening when the vehicle is in said dangerous angle;
   a weighted element, of a size permitting it to move thru said chute opening and downward in said chute, being movable downward on said track, toward said chute opening, when the vehicle is in said dangerous angle;
   a lever, pivotally connected to said housing, having a pivoted part and a free-ended part that is located at said upper chute opening and is normally in the path of movement of said weighted element, the said lever being pivotal from a first position in which said free-ended part bars movement of said weighted element into said chute opening into a second pivotal position in which said free-ended part permits said movement of the weighted element thru the chute opening; and
   a hinge having one portion fixed to said housing, another hinge portion fixed to said lever, and a pivotal element between said hinge portions;
   the said lever and weighted element being constructed and arranged, in angle of pivoting of the lever and the weight of the said free-ended part and the weight of said weighted element, to hold said lever in said first position against force of said weighted element during its jostling movement due to vibration of the vehicle, but to permit movement of the lever into said second position when the vehicle is in said dangerous position.

2. A device as set forth in claim 1, in which: the upPer end of said chute and the normally upper end of said track are joined in a common edge; the said hinge is lower in said housing than the said free-ended lever part; and said free-ended lever part, in said first position of the lever, rests on said common edge.

3. A device as set forth in claim 1, in which said track comprises: a bottom portion; and sides, limiting and guiding movement of said weighted element, fixed to said bottom portion.

4. A device as set forth in claim 3, in which: the said track in its normal upwardly inclined position has a lower end wall and a lower part of said bottom portion which together pocket said weighted element at the lower end of the inclined track; and at least one of said sides is angled, providing a baffle part of the sides which inhibits vibratory, jostling movement of said weighted element.

5. A device as set forth in claim 1, in which said weighted element is a ball and said track is angled, has angled sides, and has a sidewall part that inhibits upward, jostling movement of said ball in normal positions of the vehicle.

6. A device as set forth in claim 1, in which said lever comprises: a bar, fixed to said second-named hinge portion; and a metallic piece at said free-ended lever part, having a specific gravity greater than that of steel, fixed to a portion of said arm that is spaced from said hinge.

7. A device for preventing overturn of a motor-driven vehicle, comprising:
   a motor-control housing, adapted to be fixed to a vehicle-motor-supporting means, having: a bottom wall that in use is normally approximately level; a front wall; a rear wall; at least one sidewall that is fixed to said front and rear walls; and a removable cover;
   inside said housing: means for stopping the application of power to a vehicle-driving motor, comprising a support and a motor-controlling element on the support, movable from a motor-operating position to a motor-stopping position;
   an upright, weighted-element chute, within said housing, adjacent to said rear wall and fixed to one of said walls, having upper edges that define an upper chute opening that is adapted to receive a movable weighted element;

an angled weighted-element track that is fixed to at least one of said housing walls, normally inclined upward from a track end that is spaced from said chute, but inclined downward toward said upper chute opening when the vehicle is in a dangerous, overturn-tending angle, the said track comprising:
a bottom, having an edge at said opening, rigidly connected to said upper edges of the chute; and angled side railings, one of the angled portions of which inhibits jostling movement of said weighted-element during normal vibrations of the vehicle;
a weighted element, of a size permitting it to move thru said upper chute opening and downward in the chute, the said weighted element being movable, when the vehicle is in said dangerous angle, downward on said track and into contact with said motor-controlling element, and having sufficient weight in relation to the height of its fall in said chute to actuate said motor-controlling element into its motor-stopping position.

8. A device as set forth in claim 7, in which said means for stopping power comprises an electric switch assembly, and said motor-controlling element has sufficient length for its operation of the switch into circuit-breaking position when said element is struck by said movable weight.

9. A device as set forth in claim 7, further comprising pivoted means at said upper chute opening for preventing vibration-jolted movement of said ball into said opening when the vehicle is in normal operation, the said pivoted means comprising: a lever, having a weighted free-ended portion and a pivoted end; a pivot bearing having one bearing part rigidly fixed relatively to said housing and another part rigidly fixed to said pivoted end of the lever; the said weighted, free-ended portion being in position to block said vibration-jolted movement in normal operation of the vehicle, and when it is in said dangerous angle being swung out of said position, permitting said weight to enter said opening.

10. A device as set forth in claim 9, in which said means for stopping power comprises an electric, toggle-switch assembly in a bottom portion of said chute, and said motor-controlling element is a toggle-switch lever, having sufficient length for its operation of the switch into circuit-breaking position when said element is struck by said movable weight.

* * * * *